United States Patent [19]

Shimizu

[11] Patent Number: 4,752,120

[45] Date of Patent: Jun. 21, 1988

[54] POLARIZATION CONTROLLING DEVICE COMPRISING A BEAM SPLITTER FOR CONTROLLABLY BIFURCATING AN INPUT POLARIZED BEAM TO TWO POLARIZATION CONTROLLING ELEMENTS

[75] Inventor: Haruhito Shimizu, Tokyo, Japan

[73] Assignee: NEC Corporation, Tokyo, Japan

[21] Appl. No.: 840,828

[22] Filed: Mar. 18, 1986

[30] Foreign Application Priority Data

Mar. 18, 1985 [JP] Japan .................................. 60-53690
Oct. 22, 1985 [JP] Japan ................................ 60-234541

[51] Int. Cl.⁴ ............................................. G02B 6/10
[52] U.S. Cl. ................................ 350/388; 350/96.13; 350/96.14; 455/616
[58] Field of Search ............... 350/96.11, 96.12, 96.13, 350/96.14, 388; 455/313, 616

[56] References Cited

U.S. PATENT DOCUMENTS

| 4,153,328 | 5/1979 | Wang | 350/96.11 |
| 4,340,272 | 7/1982 | Papuchon et al. | 350/96.14 |
| 4,448,479 | 5/1984 | Alferness | 350/96.13 |
| 4,533,207 | 8/1985 | Alferness | 350/96.12 |

OTHER PUBLICATIONS

Ulrich, R., "Polarization Stabilization on Single-Mode Fiber," Applied Physics Letters, vol. 35, No. 11, Dec. 1, 1979, pp. 840-842.

Alferness et al., "Waveguide Electro-Optic Polarization Transformer," Applied Physics Letters, vol. 38, No. 9, May 1, 1981, pp. 655-657.

Barnoski et al., "Fabrication of an Access Coupler with Single-Strand Multimode Fiber Waveguides," Applied Optics, vol. 15, No. 11, Nov., 1976, pp. 2629-2630.

Primary Examiner—Bruce Y. Arnold
Assistant Examiner—Martin Lerner
Attorney, Agent, or Firm—Sughrue, Mion, Zinn, Macpeak & Seas

[57] ABSTRACT

For first and second polarization controlling elements (181, 182) driven by first and second driving voltages in a polarization controlling device, a beam splitter (15) has a dividing ratio controllable between 1:0 and 0:1 and divides an input polarized beam having an input polarization state. An output polarized beam is derived from first and second polarization controlled beams to have an output polarization state. While the dividing ratio is kept at 1:0 so that the second polarization controlled beam is null, the first driving voltage may approach either of a positive and a negative limit. In this event, a control unit (25) changes the dividing ratio to 0:1. Even while the second polarization controlled beam is null, the control unit controls the second driving voltage so that the both driving voltages are congruent modulo a unit voltage difference which makes each element carry out equivalent polarization control. The first driving voltage is likewise controlled. When the input polarization state optionally varies, the output polarization state can be defined by a mode filter, a laser diode, or two parameters descriptive of a coherent polarized beam. Irrespective of the input polarization state, the output polarization state can be defined by a signal beam which reaches the device with an optionally varying polarization state.

15 Claims, 8 Drawing Sheets

POLARIZATION CONTROLLING DEVICE COMPRISING A BEAM SPLITTER FOR CONTROLLABLY BIFURCATING AN INPUT POLARIZED BEAM TO TWO POLARIZATION CONTROLLING ELEMENTS

BACKGROUND OF THE INVENTION

This invention relates to an automatic polarization controlling device for use in an optical communication system, an optical fiber gyroscope, a like optical fiber sensor, and other polarization-sensitive optical apparatus.

In various fields of application of a coherent polarized beam, it is often necessary to carry out polarization control or stabilization so as to convert an variably polarized beam to a desirably polarized beam. Particularly in an optical heterodyne communication system, the polarization control is important because coincidence is indispensable between polarization states of a signal beam and a local oscillation beam which are mixed together into an optical beat signal. More particularly, a stabilization scheme is necessary in this instance in either aligning the polarization state of the signal beam with that of the local beam or in aligning the polarization state of the local beam with that of the signal beam. It is to be noted in this connection that the polarization state of the signal beam inevitably varies during propagation through a monomode or single-mode optical fiber due to temperature changes and other external disturbances. As a result, the optical beat signal has a fluctuating intensity. This gives rise to various problems such that the communication system has only a poor reliability and that detection of the signal beam becomes impossible in a worst case. For this reason, it is necessary to control a variably polarized beam to a desired polarized beam.

An automatic polarization controlling device is revealed in a letter contributed by R. Ulrich to Applied Physics Letters, Volume 35, No. 11 (Dec. 1, 1979), pages 840 to 842, under the title of "Polarization Stabilization on Single-mode Fiber." An electromagnet is used as a polarization controlling element in converting an element input polarized beam to an element output polarized beam in response to a driving voltage supplied to the polarization controlling element. Two electromagnets are used is series in squeezing a monomode optical fiber which is supplied with a device input polarized beam of an input polarization state and which produces a device output polarized beam of an output polarization state. The input polarization state is optionally variable. A portion of the device output polarized beam is directed by a beam splitter to a polarimeter which is used as a polarization monitor to monitor the output polarization state. The polarimeter controls a driver which produces the driving voltage for each electromagnet as an electric error signal. In other words, a feedback loop is used in controlling the output polarization state to a predetermined polarization state.

Each of the polarization controlling element and the driver is operable only in a certain voltage range. That is to say, the driving voltage must not exceed an upper and a lower range limit which usually have a common absolute value. When the input polarization state monotonically varies in one sense of rotation, the driving voltage would have to exceed the upper or the lower range limit. The polarization control becomes impossible. The driver is therefore reset according to Ulrich whenever the driving voltage of the driver under consideration approaches the upper or the lower limit. Immediately after the reset, the driver is restarted from a midrange. It is pointed out in the Ulrich letter that the reset is frequently necessary in a certain case. The frequent reset is reduced by a third electromagnetic fiber squeezer. Ulrich furthermore suggests use of a piezoelectric fiber squeezer as each polarization controlling element. At any rate, instantaneous interruption of the polarization control is unavoidable due to the reset before the driver again stably drives the polarization controlling element. The device of Ulrich is not stably operable continuously during a long term but is continuously operable only between two successive instantaneous interruptions.

Another automatic polarization controlling device is disclosed in a letter which was contributed by R. C. Alferness et al to Applied Physics Letters, Volume 38, No. 9 (May 1, 1981), pages 655 to 657, and entitled "Waveguide Electro-optic Polarization Transformer." Operation is analyzed in an article contributed by Rod C. Alferness alone to IEEE Journal of Quantum Electronics, Volume QE-17, No. 6 (June 1981), pages 965 to 969, under the title of "Electrooptic Guided-Wave Device for General Polarization Transformations." The device preferably comprises an x-cut lithium niobate or tantalate substrate which has a titanium-diffused waveguide and on which a first phase shifter, a mode converter, and a second phase shifter are integrated in cascade along the waveguide for use collectively as a polarization controlling element of a waveguide type in performing general polarization transformations. The waveguide supports a single TE or TM mode. Each phase shifter is voltage controlled to adjust a phase difference between TE and TM components of a polarized beam. The mode converter is for adjustably carrying out conversion between TE and TM modes under voltage control. The second phase shifter is unnecessary when a linear polarization state is desired as the output polarization state. At any rate, the instantaneous interruption is inevitable.

Still another automatic polarization controlling device is reported by W. A. Stallard et al as a report in the Third European Conference on Integrated Optics, held May 6–8, 1985, after the Convention date of the instant patent application. The report is recorded in Proceedings of the Conference edited by H. P. Nolting et al and published by Springer-Verlag, pages 164 et seq., particularly, pages 167 and 168. The device is a z-cut lithium niobate integrated optic device and is for use as an optical heterodyne detector. A polarization-dependent directional coupler is preferred by Stallard et al to a polarization-independent optical coupler for use in mixing the local oscillation beam with the signal beam after the polarization control. The device of Stallard et al is again susceptible to the instantaneous interruption.

In the manner exemplified above, the input polarization state may optionally vary. In this instance, the polarization control is to give a predetermined polarization state to the output polarization state. It may, however, be desirable as will be described later in the description to use an optional polarization state as a reference polarization state and to convert a predetermined polarization state to the optional polarization state.

SUMMARY OF THE INVENTION

It is therefore an object of the present invention to provide an automatic polarization controlling device which can control a polarization state of an input polarized beam with no instantaneous interruption.

It is another object of this invention to provide an automatic polarization controlling device of the type described, which is stably operable continuously during a long term.

It is still another object of this invention to provide an automatic polarization controlling device of the type described, which can convert an input polarized beam of a predetermined polarization state to an output polarized beam of an optional polarization state.

It is yet another object of this invention to provide an automatic polarization controlling device of the type described, which can give a high reliability to polarization-sensitive optical apparatus, such as an optical heterodyne detector used in an optical communication system.

Other objects of this invention will become clear as the description proceeds.

An automatic polarization controlling device to which this invention is applicable, includes voltage producing means for controllably producing a first and a second driving voltage and a first and a second polarization controlling element responsive to the first and the second driving voltages for converting a first and a second element input polarized beam to a first and a second element output polarized beam, respectively. According to this invention, the automatic polarization controlling device is characterized by a beam splitter for dividing a device input polarized beam into a first and a second part with a dividing ratio which is continuously controllable for the first and the second parts between 1:0 and 0:1, both inclusive, combining means for optically combining the first and the second element output polarized beams into a device output polarized beam, and controlling means connected to the voltage producing means and to the beam splitter for controlling the first and the second driving voltages and the dividing ratio.

DESCRIPTION OF THE PREFERRED EMBODIMENTS

Figure 1:
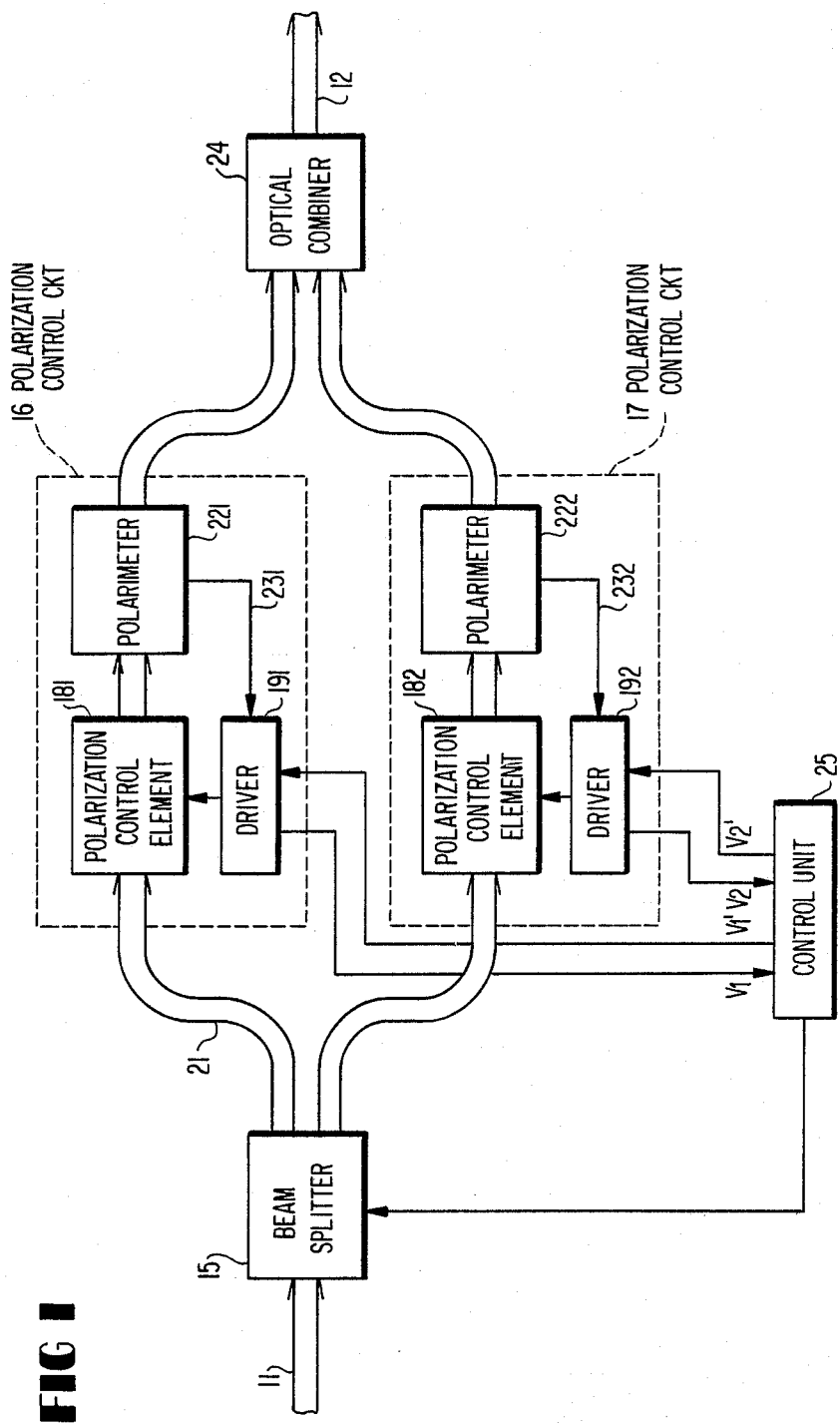
FIG. 1 is a block diagram of an automatic polarization controlling device according to a basic embodiment of the instant invention.

Referring to FIG. 1, an automatic polarization controlling device according to a basic embodiment of the present invention will be described at first in order to facilitate an understanding of the principles on which this invention is based. Description will later follow as regards details of the circuit elements and also as regards numerical examples.

The automatic polarization controlling device comprises an input waveguide 11 supplied with a coherent polarized beam as a device input polarized beam. On reaching the input waveguide 11, the device input polarized beam has an input polarization state which will be assumed to optionally vary. A device output polarized beam is produced through an output waveguide 12 with an output polarization state which is controlled or stabilized to a predetermined polarization state.

A controllable beam splitter 15 divides or bifurcates the input polarized beam into a first and a second part with a continuously monotonously controllable dividing ratio P. The beam splitter 15 has a polarization-independent dividing or separation characteristic. More particularly, the first and the second parts have first and second optical intensities of an intensity ratio which is continuously monotonously controllable between 1:0 and 0:1, both inclusive, no matter however the input polarization state may vary. It is to be noted that the first and the second parts are null or mute when the dividing ratio P is equal to 0:1 and 1:0, respectively.

First and second polarization controlling circuits 16 and 17 are supplied with the first and the second parts, respectively, from the beam splitter 15. The first polarization controlling circuit 16 comprises a first polarization controlling element 181 and a first driver 191 therefor. The second polarization controlling circuit 17 similarly comprises a second polarization controlling element 182 and a second driver 192 therefor. The first and the second polarization controlling elements 18 (suffixes omitted) have a common polarization controlling characteristic. A combination of the first and the second drivers 19 (suffixes omitted) serves as a principal element of a voltage producing arrangement as will presently be described.

A waveguide portion 21 is used as an arrangement for supplying the first part to the first polarization controlling element 181 as a first element input polarized beam. The waveguide portion 21 is a portion of waveguides which are used in the automatic polarization controlling device and include the input and the output waveguides 11 and 12. After being subjected to polarization control, the element input polarized beam is produced from the first polarization controlling element 181 as a first element output polarized beam through a first polarimeter 221 which serves as a first polarization monitor in monitoring the polarization state of the element output polarized beam relative to a reference polarization state. The polarimeter 221 thereby delivers an electric control signal to the first driver 191 as a first feedback signal through a first feedback connection 231. A feedback loop is thereby formed for the first polarization controlling element 181.

Likewise, the second part is fed to the second polarization controlling element 182 as a second element input polarized beam and is produced as a second element output polarized beam therefrom and through a second polarimeter 222 which serves as a second polarization monitor for monitoring the polarization state of the second element output polarized beam with reference to the reference polarization state used in the first polarimeter 221. The second polarimeter 222 thereby supplies a second feedback signal to the second driver 192 through a second feedback connection 232. A second feedback loop is formed for the second polarization controlling element 182. The first and second feedback loops are used in the manner described in the Ulrich letter referred to hereinabove.

An optical combiner or coupler 24 combines the first and the second element output polarized beams supplied through the polarimeters 22 (suffixes omitted). The optical combiner 24 thereby delivers the device output polarized beam to the output waveguide 12. A control unit 25 is for controlling the drivers 19 and the dividing ratio P of the beam splitter 15.

In the manner which will later be described in detail, the first driver 191 is controlled by the first feedback signal to produce a first driving voltage V1 whenever the dividing ratio P is not equal to 0:1, namely, whenever the first element output polarized beam is not null. The first driving voltage V1 is used to drive the first polarization controlling element 181. While the dividing ratio P is not equal to 1:0, the second driver 192 is controlled by the second feedback signal to produce a second driving voltage V2 for use in driving the second polarization controlling element 182. The driving voltages V (suffixes omitted) are delivered to the control unit 25.

Responsive to the second driving voltage V2 only while the dividing ratio P is equal to 0:1, the control unit 25 produces a first control voltage V1'. Like the second driving voltage V2, the first driving voltage V1 makes the control unit 25 produce a second control voltage V2' only while the dividing ratio P is equal to 1:0. The control voltages V' (suffixes omitted) are delivered to the respective drivers 19 and are used as continuations of the respective driving voltages V in driving the respective polarization controlling elements 18.

Each of the polarization controlling elements 18 and the drivers 19 is operable only in a certain voltage range. This is because the drivers 19 can not produce an infinitely high positive or negative voltage and because the polarization controlling elements 18 can withstand a finite positive or negative voltage. That is to say, the first driving voltage V1 must not exceed first upper and lower range limits V1max and V1min which usually have a common absolute value. The second driving voltage V2 must not exceed second upper and lower range limits V2max and V2min which are equal to the first upper and lower range limits in general.

It may be mentioned here with reference to the above-cited Alferness et al letter and Alferness article that the polarization state of a coherent polarized beam is uniquely defined or specified by two parameters which may be a polarization angle $\theta$ and a phase difference $\phi$. Inasmuch as each of the polarization angle and the phase difference has a period of $2\pi$ radians, the polarization state has a periodicity. More specifically, the polarization state of a polarization angle $(\theta + 2m\pi)$ radians and of a phase difference $(\phi + 2n\pi)$ radians is equivalent to the polarization state of the polarization angle $\theta$ and of the phase difference $\phi$, where each of m and n represents an integer other than zero.

To speak of the polarization controlling elements 18, each driving voltage V can have a plurality of driving values on carrying out the polarization control in a desired manner. In other words, each polarization controlling element 18 may be driven by the driving voltage V of any one of the driving values on converting the element input polarized beam to the element output polarized beam of a preselected output polarization state. Because of the periodicity of the polarization state, the driving values are equally or regularly spaced in the voltage range by a unit voltage difference $\Delta V$. Those two of the driving values which are spaced by an integral multiple of the unit voltage difference, give equivalent polarization states to the element output polarized beam. Stated otherwise, the two driving values equivalently drive each of the polarization controlling elements 18. It is necessary according to this invention that the voltage range should be at least twice as wide as the unit voltage difference.

Figure 2:
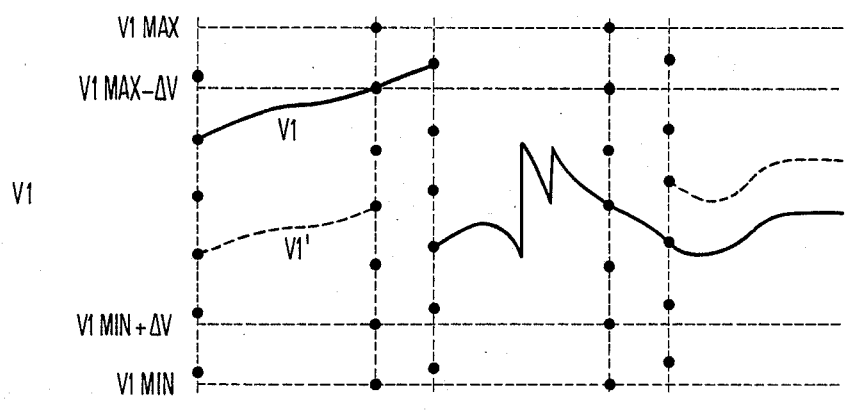
FIG. 2 is a time chart for use in describing the control carried out on a first and a second polarization controlling element and a beam splitter which are used in the automatic polarization controlling device depicted in FIG. 1.
Figure 2:
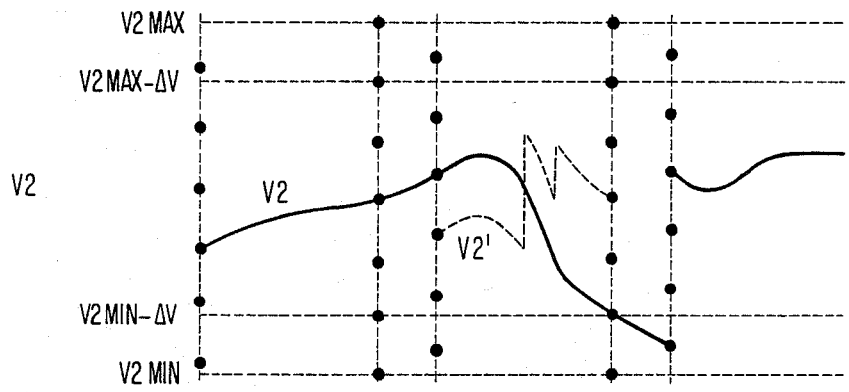
Figure 2:
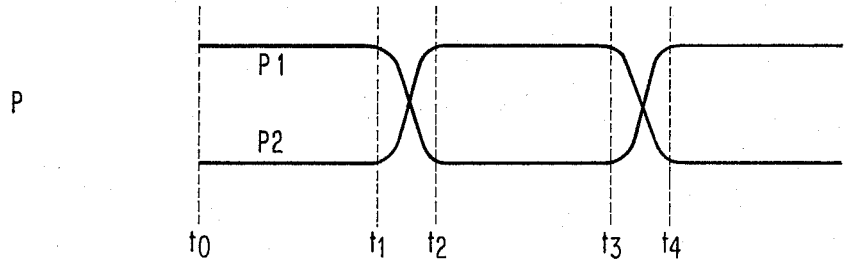

Referring to FIG. 2 in addition to FIG. 1, the first and the second upper and lower range limits V1max, V1min, V2max, and V2min are depicted for the first and the second driving voltages V1 and V2 together with first and second upper and lower control limits (V1max−$\Delta V$), (V1min+$\Delta V$), (V2max−$\Delta V$), and (V2min+$\Delta V$). Usually, the first and the second upper and lower control limits have a common absolute value. As a consequence, the first or the second upper control limit and the first or the second lower control limit are symmetric to each other in relation to a zero voltage which bisects the voltage range. The first or the second upper range limit is symmetric relative to the first or the second lower range limit also as regards the zero voltage. The dividing ratio P is depicted with the first and the second optical intensities designated by P1 and P2. The first and the second optical intensities P1 and P2 are represented by relative values which are variable between 1 and 0, both inclusive. Incidentally, each pair of the range and the control limits may have a difference other than the unit voltage difference $\Delta V$ in the manner which will later be exemplified.

At a zeroth time instant t0, it will be presumed that the dividing ratio P is controlled by the control unit 25 to 1:0. At this time instant, the first driving voltage V1 is given by the first driver 191 one of six driving values which are indicated by dots along a vertical dashed line representative of the zeroth time instant t0. The driving value of the first driving voltage V1 will be referred to hereafter as a first driving value. In response to the input polarization state of the device input polarized beam, the first driving value varies in the manner exemplified by a solid-line curve which is labelled v1. The second control voltage V2' is depicted as a portion of the second driving voltage V2. The second control voltage V2' has a control value which varies as depicted by another solid-line curve labelled v2. The control value is spaced in general from the first driving value by integral multiples of the unit voltage difference for the purpose which will later become clear. For the time being, the control value is lower than the first driving value with a spacing of two unit voltage differences kept therefrom as depicted below the curve v1 by a dashed-line curve labelled v1'. The control value should be near the zero voltage. If there are two driving values near the zero voltage, one of the two driving values should be selected as the control value, which is spaced wider from the first driving value than the other.

At a first time instant t1, the first driving voltage V1 of the first driving value approaches one of the first upper and lower range limits. At this instant, seven driving values are possible for the first driving voltage V1. The control unit 25 finds arrival of the first driving voltage V1 at either of the first upper and lower control limits. From the first time instant t1 onward, the dividing ratio P is continuously monotonously controlled or changed towards 0:1. In the meanwhile, the second control voltage V2' is not produced. The second element output polarized beam is no longer null. Controlled by the second feedback signal, the second driving voltage V2 takes over the second control voltage V2' immediately after the first time instant t1. The first driving voltage V1 is still continuously controlled by the first feedback signal as in a time interval between the zeroth and the first time instants t0 and t1.

At a second time instant t2, the dividing ratio P reaches 0:1. At this instant, each of the first and the second driving voltages V has one of six driving values. Drive of the first polarization controlling element 181 is transferred from the first driving voltage V1 to the first control voltage V1' which is depicted as a continuation of the first driving voltage V1 by a solid-line curve. From the second time instant t2 on, the second driving voltage V2 is fully controlled by the second feedback signal in the manner exemplified as a continuation of the second control voltage V2'. The second driving voltage V2 has one of the six driving values as a second driving value. The first control voltage V1' is given a first control value which is spaced from the second driving value by integral multiples of the unit voltage difference. The first control value is depicted below and above the second driving voltage V2 by a dashed-line curve which is labelled v2'. The first control value should be selected in the manner described above in connection with the second control voltage V2'. The control value of the second control voltage V2' may now be called a second control value.

At a third time instant t3, the second driving voltage V2 or the second driving value reaches one of the second upper and lower control limits. Seven driving values are possible for the second driving voltage V2. It will be seen that the first control value of the first control voltage V1' is equal to the zero voltage at this instant in the manner depicted along the dashed-line curve v2'. In response to arrival of the second driving voltage V2 at either of the second upper and lower control limits, the control unit 25 continuously monotonously changes the dividing ratio P towards 1:0. From the third time instant t3 on, the polarization state of the first and the second element input polarized beams are controlled in the manner described above for the first time instant t1.

At a fourth time instant t4, the dividing ratio P reaches 1:0. The polarization control is carried out solely on the first element input polarized beam as described before for the zeroth time instant t0 and thereafter.

Reviewing FIGS. 1 and 2, it should be noted that the first element input polarized beam is positively or actively subjected to the polarization control in the time interval between the zeroth and the first time instants t0 and t1. Meanwhile, the second element input polarized beam is null. The second polarization controlling element 182 is nevertheless driven by the second control voltage V2' so that, if the second element input polarized beam were present with the same polarization state as that of the first element input polarized beam, the second element output polarized beam would have a polarization state which would be kept equivalent to the actually controlled or stabilized polarization state of the first element output polarized beam throughout the time interval in question.

The automatic polarization controlling device therefore carries out the polarization control or stabilization on the device input polarized beam stably with no instantaneous interruption, eternally in principle, no matter however the input polarization state may vary. Furthermore, the automatic polarization controlling device has an insertion loss which is kept constant throughout the operation.

Figure 3:
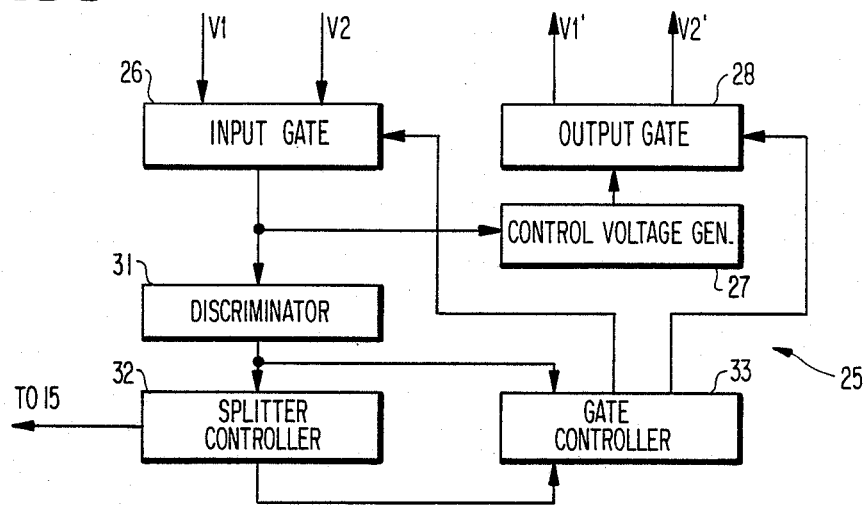
FIG. 3 is a block diagram of a control unit for use in the automatic polarization controlling device illustrated in FIG. 1.
Figure 4:
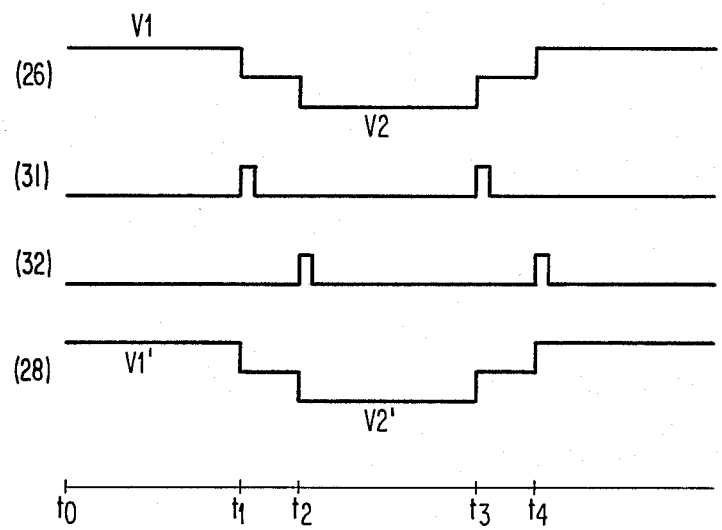
FIG. 4 is a time chart for use in describing operation of the control unit depicted in FIG. 3.

Turning to FIGS. 3 and 4, the control unit 25 may comprise an input gate 26 to which the first and the second driving voltages V1 and V2 are supplied from the first and the second drivers 191 and 192 (FIG. 1) during different time intervals. When supplied with neither of the driving voltages V, the input gate 26 is given a high impedance state indicated in FIG. 4 by a horizontal line midway between two horizontal lines which are drawn higher and lower in order to represent the first and the second driving voltages V. The input gate 26 is put into the high impedance state by a first control signal which will presently be described.

Supplied with the first and the second driving voltages V through the input gate 26 one at a time, a control voltage generator 27 generates the first and the second control voltages V1' and V2' with the first and the second control values in the manner described above with reference to FIGS. 1 and 2. The control voltages V' are delivered to an output gate 28 which will shortly be described.

It may be mentioned here that the zeroth through the fourth time instants t1 to t4 are depicted in FIG. 4 at the bottom of the figure. Supplied with the first or the second driving voltage V through the input gate 26, a discriminator 31 produces a first trigger pulse whenever the first or the second driving voltage V reaches either of the upper and the lower control limits. Responsive to the trigger pulse, a splitter controller 32 controls the beam splitter 15 (FIG. 1) to change the dividing ratio P either from 1:0 to 0:1 or from 0:1 to 1:0. Upon completion of change of the dividing ratio P, the controller 32 produces a second trigger pulse.

A combination of the discriminator 31 and the controller 32 serves as a main element of a ratio controlling arrangement. Connected to the voltage producing arrangement 19 and to the beam splitter 15, the ratio controlling arrangement controls the dividing ratio P from 1:0 towards 0:1 whenever the first driving voltage V1 approaches either of the upper and the lower range limits V1max and V1min. The ratio controlling arrangement furthermore controls the dividing ratio P from 0:1 towards 1:0 whenever the second driving voltage V2 approaches either of the upper and the lower range limits V2max and V2min.

A gate controller 33 is controlled by each first trigger pulse to produce the above-mentioned first control signal. In response to each second trigger pulse, the gate controller 33 delivers a second control signal to the output gate 28. Until production of each first control signal, the output gate 28 delivers the first and the second control voltages V1' and V2' to the first and the second drivers 191 and 192 (FIG. 1) one at a time. Responsive to the first control signal, the output gate 28 is put into a high impedance state. Neither of the first and the second control voltages V' is delivered to the drivers 19 in te meantime. Whenever the second control signal is produced, the output gate 28 again delivers the first and the second control voltages V' to the drivers 19.

Reviewing FIGS. 1 through 4, it is now clear that the control unit 25 serves as a controlling arrangement connected to the voltage producing arrangement 19 and to the beam splitter 15 to control the dividing ratio P. It is possible to understand that the voltage producing arrangement 19 includes those parts of the control voltage generator 27 which generate the first and the second control voltages V', respectively. From a different view, the first and the second control voltages V' can be regarded as those parts of the first and the second driving voltages V which are produced by the voltage producing arrangement 19. In this event, the gate controller 28 serves as a part of a voltage controlling arrangement. Connected to the voltage producing arrangement and the ratio controlling arrangement, the part 28 controls the first and the second driving voltages so that the first driving voltages (V1') and the second driving value are congruent with each other, modulo the unit voltage difference while the second driving value is between the upper and the lower range limits Vmax and Vmin (suffixes 1 and 2 omitted) and furthermore while the dividing ratio P is kept at 0:1 and that the second driving voltage (V2') and the first driving value are congruent with each other, modulo the unit voltage difference while the first driving value is between the upper and the lower range limits and furthermore while the dividing ratio P is kept at 1:0.

Incidentally, the polarimeter 22 can be modified in the manner which will later be described. Moreover, the polarization control can be carried out not by the feedback loops but by detecting a difference between the polarization state of either the device input polarized beam or each of the first and the second element input polarized beams and an output polarized state preselected for the device output polarized beam and by using the difference in a feed forward fashion.

Figure 5:
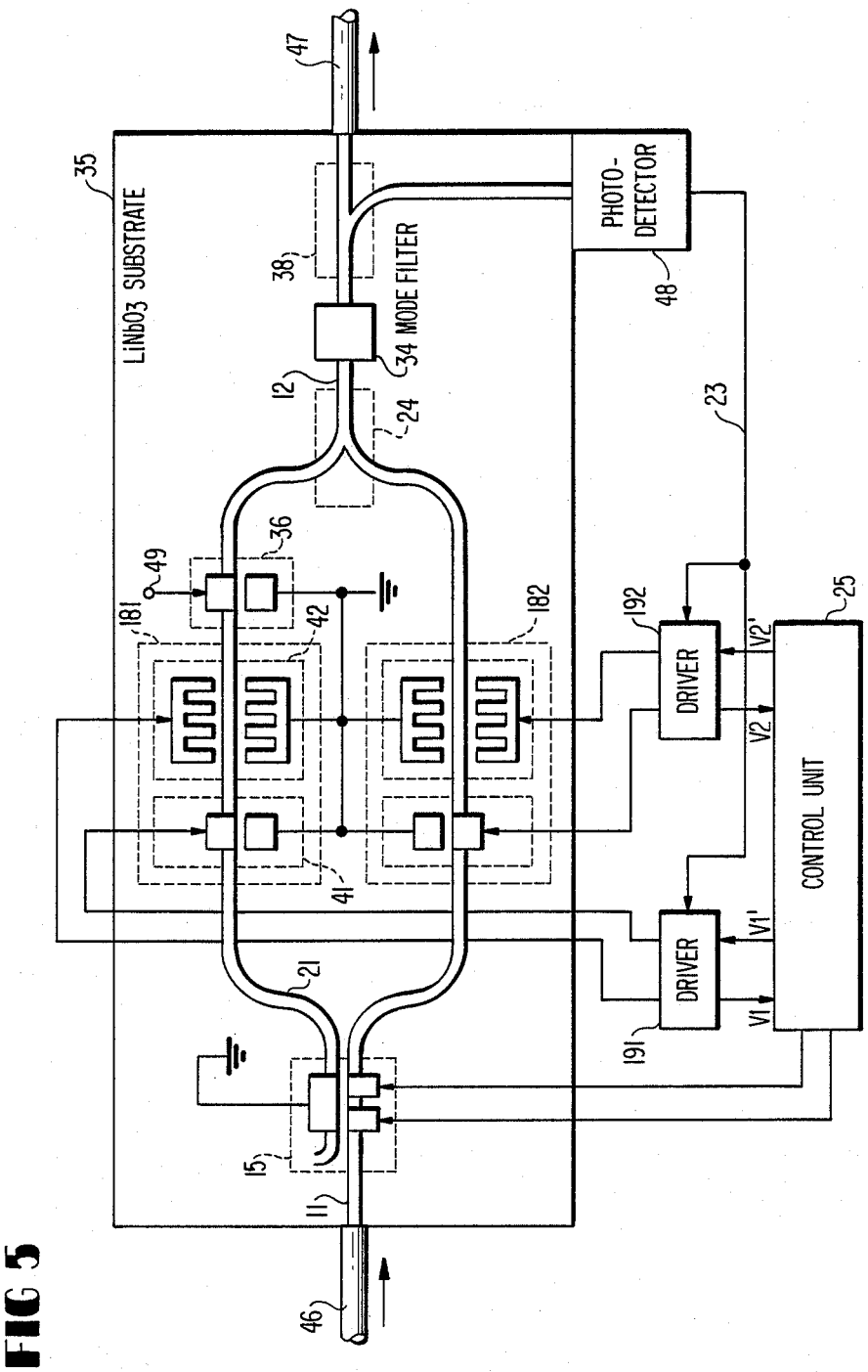
FIG. 5 shows, partly in a schematic plan and partly in blocks, an automatic polarization controlling device according to a first practical embodiment of this invention.

Referring now to FIG. 5, description will be given as regards an automatic polarization controlling device according to a first practical embodiment of this invention. The automatic polarization controlling device is an integrated optical device which is manufactured like the device disclosed in the above-cited Alferness et al letter and Alferness article or the device revealed in the above-referenced Stallard et al report. In FIG. 5, similar parts are designated by like reference numerals.

A lithium niobate substrate 35 is used, which is 20×30 mm wide. A titanium film is selectively sputtered onto the substrate 35 by resorting to photolithography and thereafter theremally diffused to provide channel waveguids of a common width of 8 microns as the waveguides mentioned before in conjunction with FIG. 1. The channel waveguide supports the fundamental mode of TE and TM modes for a coherent optical beam of a wavelength of 1.55 microns. As a buffer layer, a silicon dioxide layer (not shown) is formed on the substrate 35 by CVD (chemical vapor deposition) to cover the channel waveguides.

In the manner which will presently be described in detail, the beam splitter 15, the first and the second polarization controlling elements 181 and 182, the optical combiner 24, a compensating phase modulator 36, and an output beam splitter 38 are formed as waveguide-type elements by selectively vacuum evaporating chromimum-aluminium electrodes onto the buffer layer by photolithography. The beam splitter 15 thus far described, will now be called an input beam splitter. A mode filter 39 is formed by selectively removing the buffer layer and then forming another chromium-aluminium electrode partly on the substrate 35 and partly on the channel waveguide.

The input beam splitter 15 is an optical directional coupler of the type which is described in an article contributed by Herwig Kogelnik et al to IEEE Journal of Quantum Electronics, Volume QE-12. No. 7 (July 1976), pages 396 to 401, under the title of "Switched Directional Coupler with Alternating $\Delta\beta$." The input beam splitter 15 has a total length of 5 mm and is polarization-independent as described before. Channel waveguides of the input beam splitter 15 are 3 microns spaced.

In the manner described in the Alferness et al letter, the Alferness article, and the Stallard et al report, each of the first and the second polarization controlling elements 18 comprises a controlling phase modulator 41 and a mode converter 42 in succession from the waveguide portion 21 towards the optical combiner 24. The controlling phase modulator 41 is of the type which is described also in a letter contributed by I. P. Kaminow et al to Applied Physics Letters, Volume 22, No. 10 (May 15, 1973), pages 540 to 549, under the title of "Thin-film LiNbO$_3$ Electro-optic Light Modulator." It is unnecessary here to use the "final" or "second" phase shifter or modulator described in the Alferness et al letter and the Alferness article.

Like the phase controller described in the Stallard et al report, the controlling phase modulator 41 has two rectangular electrodes over the channel waveguide and the substrate 35 with an electrode spacing of 5 microns and a total length of 6 mm. Similarly, the mode converter 42 has two finger electrodes on both sides of the channel waveguide with an electrode spacing of 12 microns and a total length of 15 mm.

The optical combiner 24 is of the type which is described in an article contributed by Masamitsu Haruna et al to Journal of Lightwave Technology, Volume LT-1, No. 1 (March 1984), pages 223 to 227, under the title of "Electrooptical Branching Waveguide Switches and their Application to 1×4 Optical Switching Networks." Among symmetric and asymmetric structures described by Haruna et al, the optical combiner 24 has a Y-shaped symmetric structure. The aluminium or chromium-aluminium electrode is indicated in FIG. 5 only by its outline. This is merely for clearly depicting the Y-shaped structure.

The compensating phase modulator 36 is not different in structure from the controlling phase modulator 41. The electrode spacing is 5 microns. The total length is 3 mm. The output beam splitter 38 has a Y-shaped asymmetric structure described by Haruna et al. The aluminium or chromium-aluminium electrode is indicated again by its outline alone. The asymmetric structure comprises a straight branch and a lateral or side branch. The mode filter 39 is of the type which is described in a letter contributed by Yasuharu Suematsu et al to Applied Physics Letters, Volume 21, No. 6 (Sept. 15, 1973), pages 291 to 293, under the title of "Fundamental Transverse Electric Field (TE$_0$) Mode Selection for Thin-film Asymmetric Light Guides." The mode filter 39 attenuates the TM mode and has a small insertion loss and a small loss for the TE mode. The total length is 10 mm.

In FIG. 5, it will be seen that the input and the output waveguides 11 and 12 and an extension of the lateral branch of the output beam splitter 38 have first through third ends on a periphery of the substrate 35. The first and the second ends are coupled to monomode optical input and output fibers 46 and 47. The third end is connected to a photodetector 48.

In the first and the second polarization controlling elements 18, the controlling phase modulator 41 carries out phase control on a relevant one of the first and the second element input polarized beams to produce a phase controlled beam. The mode converter 42 carries out mode control on the phase controlled beam to produce a mode controlled beam. The mode controlled beam is dilivered from the first polarization controlling element 181 to the compensating phase modulator 36 and is produced therefrom as the first element output polarized beam. The mode controlled beam of the second polarization controlling element 182 is used as the second element output polarized beam as it stands.

The compensating phase modulator 36 is controlled by an electric voltage supplied to a control terminal 49 to compensate for a difference in optical paths between the input waveguide 11 and the optical combiner 24. The device output polarized beam which is produced from the optical combiner 24 and is so called thus far, will now be called a combined beam. The mode filter 39 is for aligning the polarization state of the combined beam to the TE mode to produce a TE mode beam which will afresh be called the device output polarized beam. The output beam splitter 38 branches a portion of the device output polarized beam to the lateral branch. Supplied with the portion, the photodetector 48 monitors the optical intensity of the device output polarized beam to produce an electric control signal representative of the optical intensity.

The electric control signal is delivered to the first and the second drivers 191 and 192 through a feedback connection which corresponds to the first and the second feedback connections 231 and 232 (FIG. 1) and may be denoted by the reference numeral 23. In cooperation with the control unit 25, the drivers 19 control the first and the second driving voltages V to stabilize the output polarization state to the TE mode. A common feedback loop is therefore formed for the polarization controlling elements 18 and the drivers 19. The feedback loop controls the driving voltages V so that the combined beam may have the TE mode.

Each of the first and the second driving voltages V comprises a phase controlling component Vp for the phase modulator 41 and a mode controlling component Vm for the mode converter 42. For the example being illustrated, the phase controlling component Vp has a maximum absolute value of 30 volts. The mode controlling component Vm has a maximum absolute value of 20 volts. The unit voltage difference ΔV is 12 volts for the phase controlling component Vp and 10 volts for the mode controlling component Vm. The control limit is given an absolute value which is 2 volts less than the maximum absolute value both for the phase and the mode controlling components Vp and Vm. In connection with the control voltages V', the control value is selected between plus 4 volts and minus 4 volts for the phase controlling component Vp and between plus 2 volts and minus 2 volts for the mode controlling component Vm.

Samples were manufactured as above. It has been confirmed that transfer is possible in 1 microsecond between the dividing ratio P of 1:0 and 0:1. The samples had an insertion loss of only 5 dB.

If desired, the device output polarized beam can be given the TM mode by making the mode filter 39 align the combined beam to the TM mode. The elements may be implemented by microoptics. For example, the input beam splitter 15 may be a liquid crystal switch. Each polarization controlling element 18 may either be an optical fiber squeezer or a bulk of an electrooptical crystal. The mode filter 39 may be a fiber-type mode filter which is implemented by an optical fiber having a vapor-deposited side surface. Each of the optical combiner 24 and the output beam splitter 38 may be implemented by distributed coupling in the manner which is described in an article contributed by R. C. Alferness et al to Applied Physics Letters, Volume 18, No. 23 (Dec. 1, 1979), pages 4012 to 4016, under the title of "Characteristics of Ti-diffused Lithium Niobate Optical Directional Couplers." Alternatively, each of the optical combiner 24 and the output beam splitter 38 may be a fiber-type beam combiner or splitter of the type which is described in an article contributed by M. K. Barnoski et al to Applied Optics, Volume 15, No. 11 (November 1976), pages 2629 and 2630, under the title of "Fabrication of an Access Coupler with Single-strand Multimode Fiber Waveguides."

Figure 6:
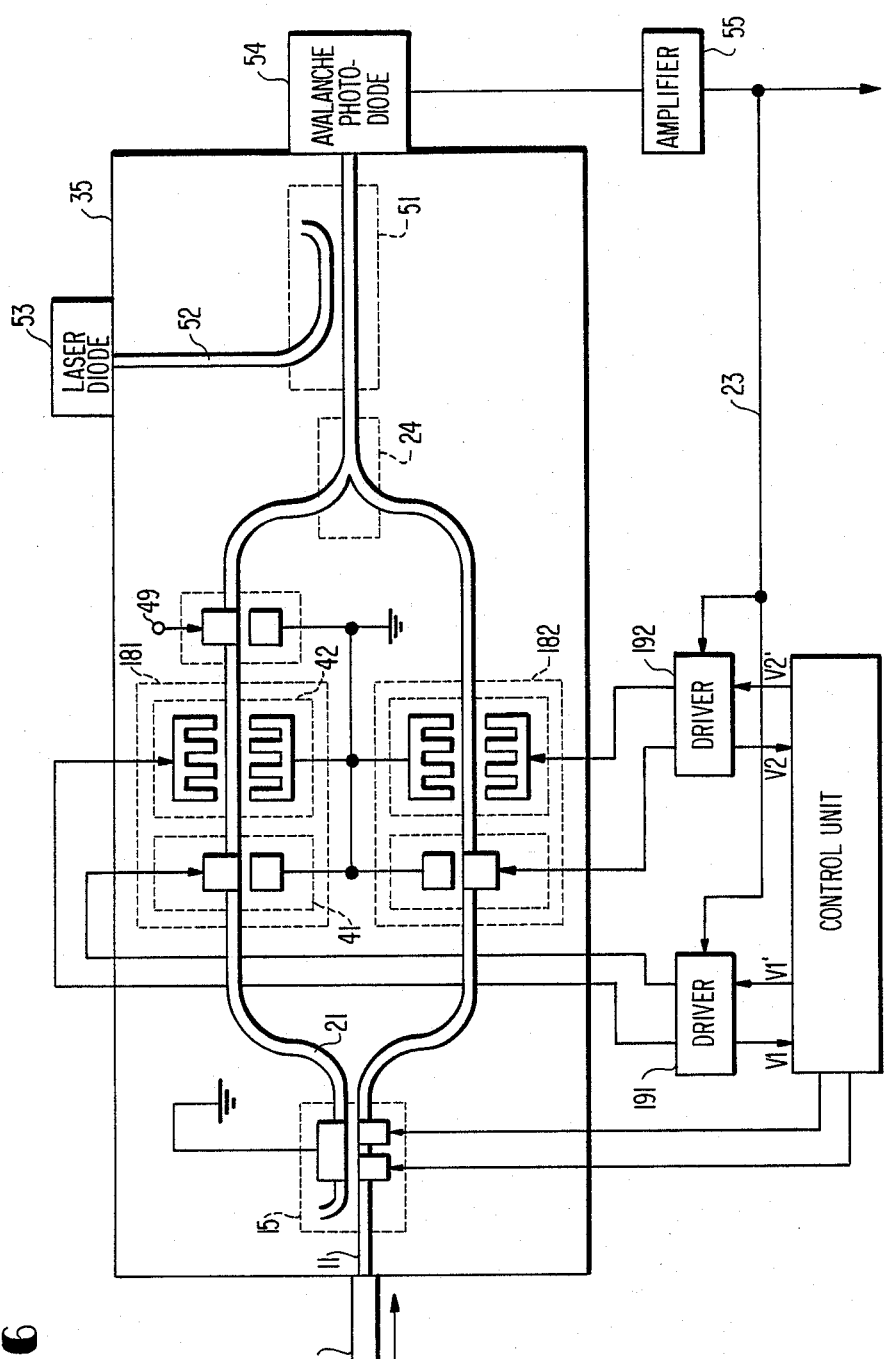
FIG. 6 similarly shows an automatic polarization controlling device according to a second practical embodiment of this invention.

Referring to FIG. 6, an automatic polarization controlling device according to a second practical embodiment of this invention is for use as an optical heterodyne detector. The automatic polarization controlling device has a structure which is similar to that illustrated with reference to FIG. 5. Similar parts are designated by like reference numerals.

Among the elements integrated on the substrate 35 in FIG. 5, the output beam splitter 38 and the mode filter 39 are removed from the device being illustrated. The output fiber 47 is also removed. Instead, the device output polarized beam is fed from the output waveguide 12 to a straight branch of an optical mixer 51 which is an optical combiner or coupler of the type described in the last-referenced Alferness et al article and has a waveguide spacing of 3 microns and a total length of 1.5 mm. A separate channel waveguide 52 is formed on the substrate 35 to have an input end on the periphery of the substrate 35. A laser diode 53 is connected to the input end. The laser diode 53 includes an isolator (not shown) and serves as a local oscillation generator for generating a local oscillation beam having a linear polarization state. Through the separate channel waveguide 52, the local oscillation beam is introduced to a curved brach of the optical mixer 51. The straight branch is extended to an output end at the periphery of the substrate 35. An avalanche photodiode 54 is connected to the output end as a photodetector.

A signal beam representative of information is introduced into the input waveguide 11 through the input fiber 46. In the manner which will shortly be described, the polarization controlling device controls the input polarization state so that the output polarization state may be coincident with the linear polarization state no matter however the input polarization state may vary.

The device output polarized beam and the local oscillation beam are mixed together by the optical mixer 51 into a mixed beam. The avalanche photodiode 54 detects the mixed beam to produce an intermediate frequency signal as an electric information signal representative of the information carried by the signal beam. An amplifier 55 amplifies the information signal into an amplified signal. A portion of the amplified signal is delivered to the first and the second drivers 191 and 192 through a feedback connection 23 of the type described in connection with FIG. 5. A feedback loop thereby formed, controls the driving voltages V so that the amplified signal may have a maximum amplitude, namely, so that the output polarization state may be coincident with the linear polarization state.

Figure 7:
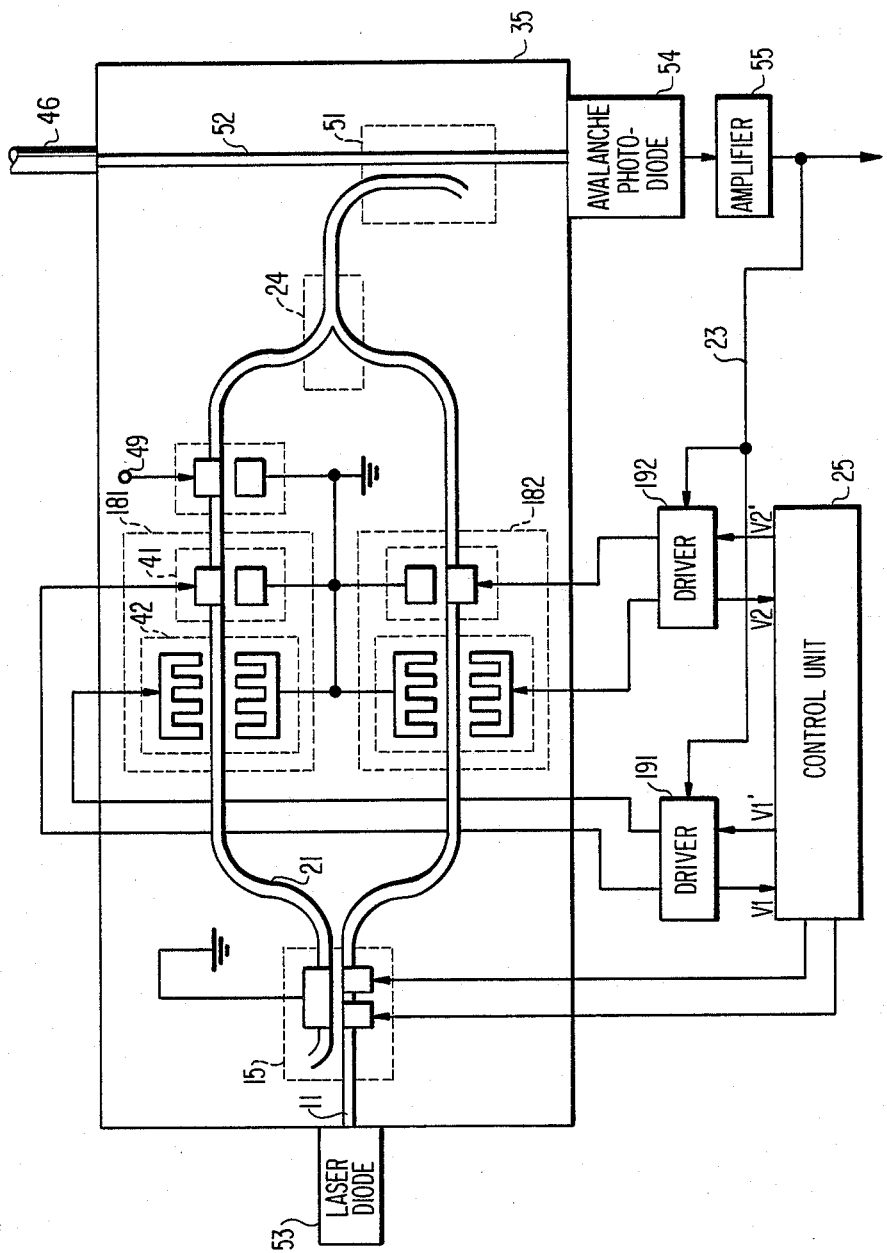
FIG. 7 likewise shows an automatic polarization controlling device according to a third practical embodiment of this invention.

Turning to FIG. 7, description will proceed to an automatic polarization controlling device according to a third practical embodiment of this invention. The automatic polarization controlling device is again for use as an optical heterodyne detector and comprises similar parts designated by like reference numerals.

In FIG. 7, the separate channel waveguide 52 is straight and has an input and an output end on the periphery of the substrate 35. A portion of the separate channel waveguide 52 is used as the straight branch of the optical mixer 51. The input fiber 46 is coupled to the input end. The laser diode 53 is connected to the first end. The avalanche photodiode 54 is connected to the output end. The output waveguide 12 is connected to the curved branch of the optical mixer 51. It should be noted in each of the first and the second polarization controlling elements 181 and 182 that the mode converter 42 and the phase modulator 41 are arranged in a reversed order. This is in order to deal with the linear polarization state of the local oscillation beam as the device input polarized beam.

The feedback loop controls the driving voltages V so that the output polarization state may always be coincident with the polarization state of the input beam, which is optionally variable. The signal beam is not attenuated by the polarization controlling elements 18 and the like at all. The separate channel waveguide 52 is rendered straight in order to further reduce the loss which would otherwise be caused to the signal beam.

Figure 8:
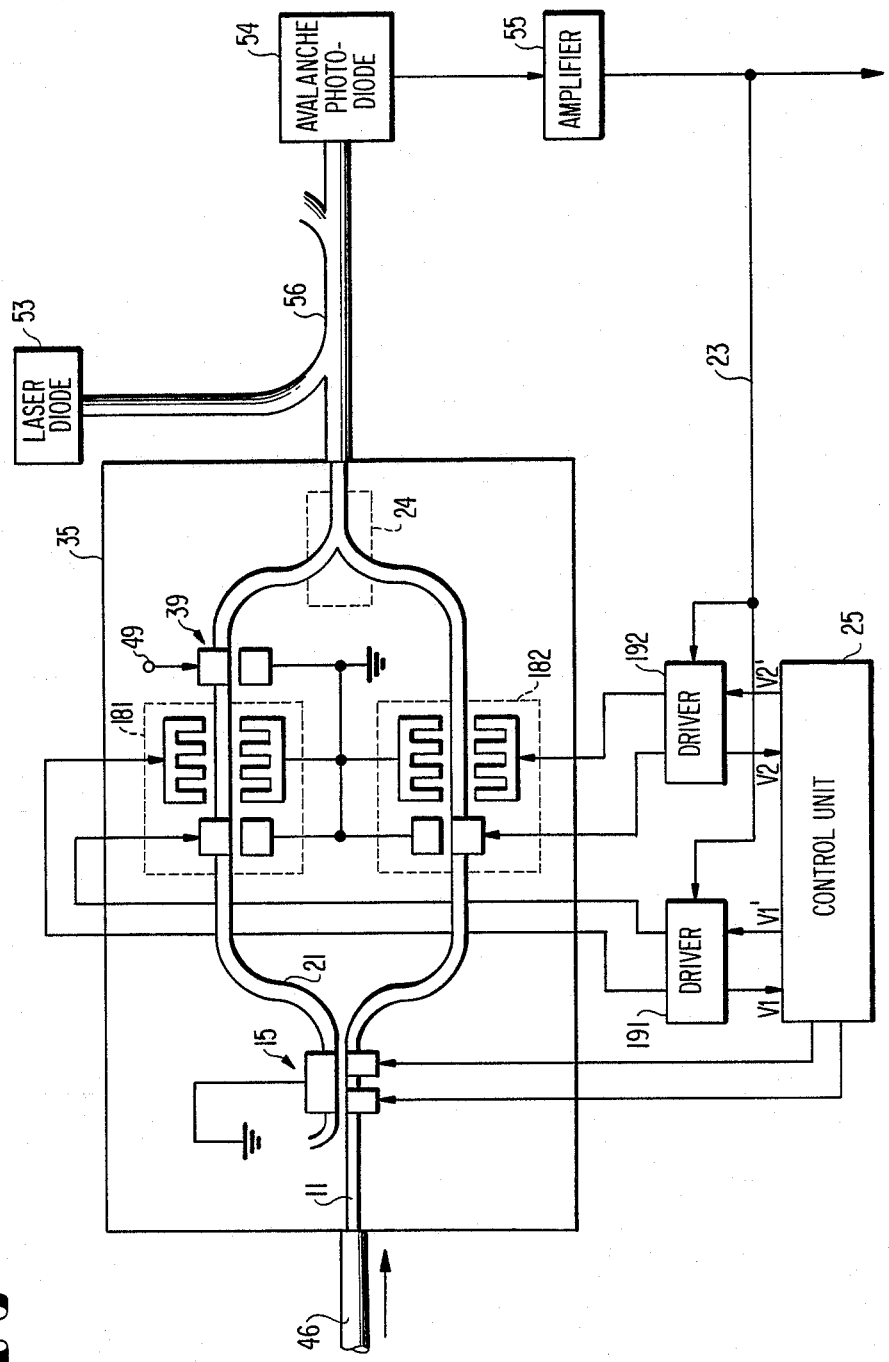
FIG. 8 likewise shows an automatic polarization controlling device according to a fourth practical embodiment of this invention.

Referring to FIG. 8, an automatic polarization controlling device according to a fourth practical embodiment of this invention is for use again as an optical heterodyne detector. Similar parts are used and are designated by like reference numerals.

In FIG. 8, an optical mixer 56 has the fiber type described in the above-referenced Barnoski et al article. More particularly, the fiber-type optical mixer 56 has a straight and a curved branch, which have a main and a side input end and a common output end. The input fiber 46 is coupled to the first end as in FIG. 6. The second end of the output waveguide 12 is coupled to the main input end. The laser diode 53 is connected to the side input end. The avalanche photodiode 54 is connected to the common output end. The fiber-type optical mixer 56 has a smaller insertion loss than the waveguide-type optical mixer 51 (FIGS. 6 or 7).

Figure 9:
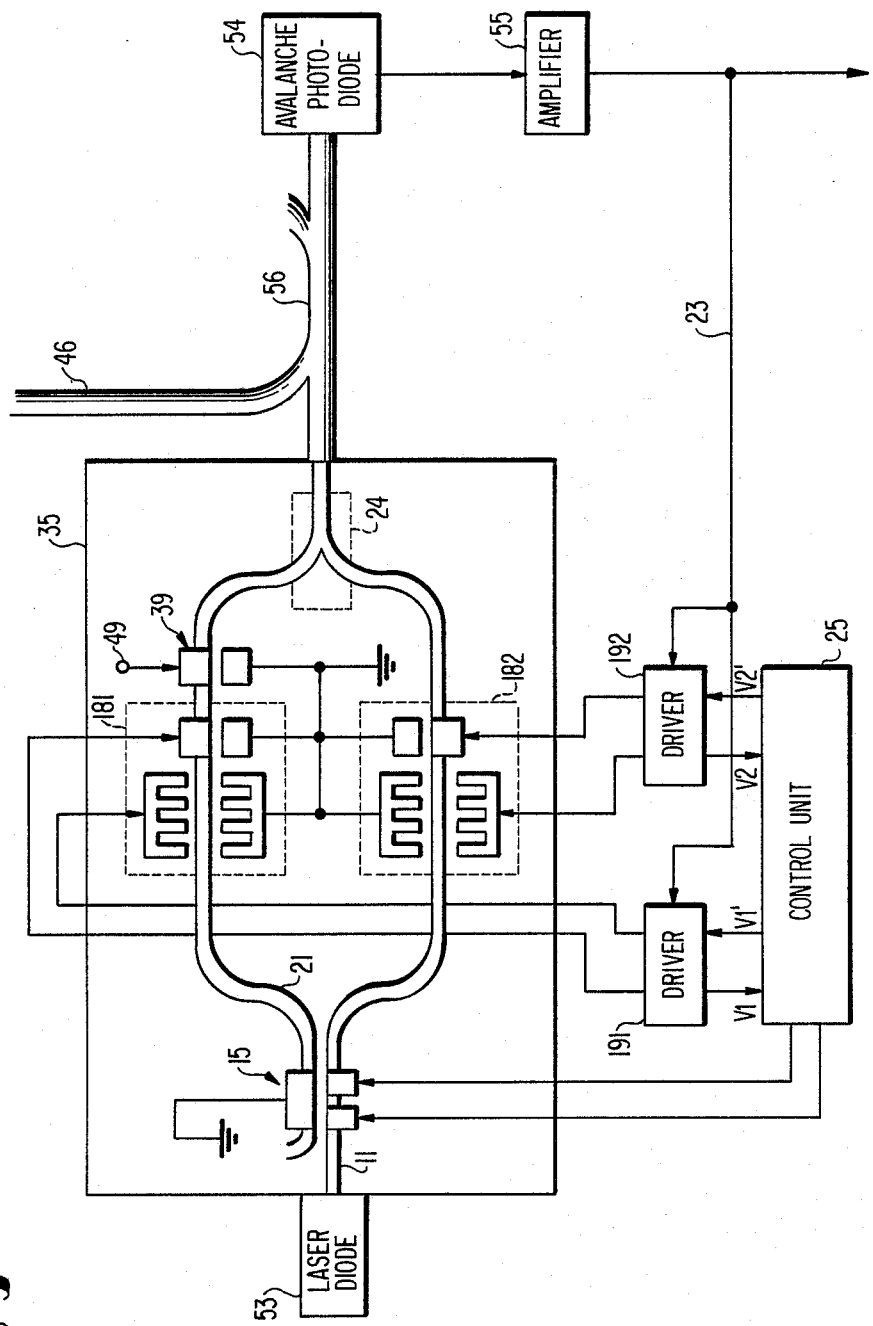
FIG. 9 similarly shows an automatic polarization controlling device according to a fifth practical embodiment of this invention.

Turning to FIG. 9, description will finally proceed to an automatic polarization controlling device according to a fifth practical embodiment of this invention. The automatic polarization controlling device is for use once more as an optical heterodyne detector and has a structure which is similar to those illustrated with reference to FIGS. 7 and 8. Similar parts are designated again by like reference numerals.

In FIG. 9, the fiber-type optical mixer 56 is used. The laser diode 53 is connected to the first end as in FIG. 7. The input fiber 46 has an extension as the curved branch of the optical mixer 56. The optical heterodyne detector being illustrated, had an insertion loss of 0.2 dB for the signal beam.

Reviewing FIGS. 5 through 9, it will be understood that a combination of either the mode filter 39 and the photodetector 48 or of the separate channel waveguide 52 and the avalanche photodiode 54 serves as a monitoring arrangement. Responsive to the device output polarized beam, the monitoring arrangement monitors the output polarization state relative to a reference polarization state which is defined by the mode filter 39 or by the signal or the local oscillation beam supplied to the separate channel waveguide 52. The monitoring arrangement thereby produces an electric control signal representative of a state difference between the output and the reference polarization state. Instead of the mode filter 39, the feed forward control is applicable to the device illustrated with reference to FIG. 5.

The feedback connection 23 serves as a voltage adjusting arrangement which is connected to the voltage producing arrangement 19 and is supplied with the electric control signal. The voltage adjusting arrangement adjusts the first and the second driving voltages V so as to make the first and the second polarization controlling elements 18 produce the first and the second element output polarized beams which can be combined into the device output polarized beam with the output polarization state adjusted to the reference polarization state.

A combination of the monitoring and the voltage adjusting arrangements serves as a voltage controlling arrangement. Connected to the ratio controlling arrangement, the voltage controlling arrangement positively or actively controls the first and the second driving voltages V while the dividing ratio P is kept at 1:0 and is changed to 0:1 and while the dividing ratio P is kept at 0:1 and is changed to 1:0, respectively. The voltage controlling arrangement furthermore controls the first and the second driving voltages V to make the first driving voltage V1 follow a first one of a plurality of the above-mentioned driving values while the dividing ratio P is kept at 1:0 and is changed towards 0:1 and to make the second driving voltage V2 follow a second one of the driving values while the dividing ratio P is kept at 0:1 and is changed towards 1:0.

While this invention has so far been described in connection with a single basic embodiment and several practical embodiments thereof and in connection with various modifications, it will be now readily possible for one skilled in the art to carry this invention into effect in various other manners. For example, the substrate 35 may be made of a different material insofar as the material has the electrooptical effect as, for example, PLZT (lead lanthanum zirconate titanate) or GaAs. Above all, it is possible to define the reference polarization state by a predetermined polarization angle $\theta$ and a predetermined phase difference $\phi$ or any other parameters of a coherent polarized beam. Incidentally, the fact should clearly be understood that specific configurations and the numerical values are described only by way of example as regards the electrodes which are used in the automatic polarization controlling devices illustrated with reference to FIGS. 5 through 9.

What is claimed is:

1. An automatic polarization controlling device including voltage producing means for controlling producing a first driving voltage and a second driving voltage, a first polarization controlling element and a second polarization controlling element responsive to said first and said second driving voltages respectively, for converting a first and a second element input polarized beam to a first and a second element output polarized beam, respectively, wherein the improvement comprises:
- a beam splitter for dividing a device input polarized beam into a first and a second part with a dividing ratio which is continuously controllable for said first and said second parts between 1:0 and 0:1, both inclusive;
- means for supplying said first and said second parts to said first and said second polarization controlling elements as said first and said second element input polarized beams, respectively;
- combining means for optically combining said first and said second element output polarized beams into a device output polarized beam; and
- controlling means connected to said voltage producing means and to said beam splitter for controlling said first and said second driving voltages and said dividing ratio such that the first and second driving voltages can equivalently drive said first and second polarization controlling elements thereby preventing instantaneous interruptions in the polarization control.

2. An automatic polarization controlling device as claimed in claim 1, each of said first and said second driving voltages having an upper and a lower range limit, wherein said controlling means comprises:
- ratio controlling means connected to said voltage producing means and to said beam splitter for controlling said dividing ratio from 1:0 towards 0:1 whenever said first driving voltage approaches either of said upper and said lower range limits, said ratio controlling means being for furthermore controlling said dividing ratio from 0:1 towards 1:0 whenever said second driving voltage approaches either of said upper and said lower range limits; and
- voltage controlling means, connected to said voltage producing means and to said ratio controlling means, for positively controlling said first and said second driving voltages while said dividing ratio is kept at 1:0 and is changed towards 0:1 and while said dividing ratio is kept at 0:1 and is changed towards 1:0, respectively.

3. An automatic polarization controlling device as claimed in claim 2, wherein said voltage controlling means is for furthermore controlling said first and said second driving voltages so that said first and said second driving voltages are congruent with each other and have a modulos equal to a unit voltage difference which makes each of said first and said second polarization controlling elements carry out equivalent polarization control.

4. An automatic polarization controlling device as claimed in claim 2, wherein:
- said voltage controlling means is for controlling said first and said second driving voltages to make said first driving voltage follow a first one of a plurality of driving values while said dividing ratio is kept at 1:0 and is changed towards 0:1 and to make said second driving voltage follow a second one of said driving values while said dividing ratio is kept at 0:1 and is changed towards 1:0, said driving values being equally spaced between said upper and said lower range limits by a unit voltage difference, two of said driving values which are spaced by an integral multiple of said unit voltage difference equivalently driving each of said first and said second polarization controlling elements;
- said ratio controlling means controlling said driving ratio from 1:0 towards 0:1 and from 0:1 towards 1:0 whenever said first and said second ones of the driving values approach either of said upper and said lower range limits, respectively.

5. An automatic polarization controlling device as claimed in claim 4, wherein said voltage controlling means is for furthermore controlling said first and said second driving voltages so that said first driving voltage and said second one of the driving values are congruent modulo said unit voltage difference while said second one of the driving values is between said upper and said lower range limits and furthermore while said dividing ratio is kept at 0:1 and that said second driving voltage and said first one of the driving values are congruent with each other and have 2 modulos equal to said unit voltage difference while said first one of the driving values is between said upper and said lower range limits and furthermore while said dividing ratio is kept at 1:0.

6. An automatic polarization controlling device as claimed in claim 1, each of said first and said second driving voltages having an upper and a lower range limit, wherein said controlling means comprises:
- ratio controlling means connected to said voltage producing means and to said beam splitter for controlling said dividing ratio from 1:0 towards 0:1 whenever said first driving voltage approaches either of said upper and said lower range limits, said ratio controlling means being for furthermore controlling said dividing ratio from 0:1 towards 1:0 whenever said second driving voltage approaches either of said upper and said lower range limits;
- monitoring means, responsive to said device output polarized beam, for monitoring an output polarization state which said device output polarized beam has relative to a reference polarization state to produce an electric control signal representative of a state difference between said output and said reference polarization states; and
- voltage adjusting means, connected to said voltage producing means and responsive to said control signal, for adjusting said first and said second driving voltages so as to make said first and said second polarization controlling elements produce said first and said second element output polarized beams which are combined into said device output polarized beam with said output polarization state adjusted to said reference polarization state.

7. An automatic polarization controlling device as claimed in claim 6, wherein said monitoring means comprises:
- a mode filter responsive to said device output polarized beam for producing a filter output beam with a predetermined one of TE and TM modes; and
- a photodetector responsive to said filter output beam for producing said electric control signal with said predetermined one of TE and TM modes used as said reference polarization state.

8. An automatic polarization controlling device as claimed in claim 6, wherein said reference polarization state is a linear polarization state of a local oscillation beam.

9. An automatic polarization controlling device as claimed in claim 8, said device input polarized beam being a signal beam representative of information, wherein:

said monitoring means comprises:

an optical mixer for mixing said device output polarized beam and said local oscillation beam into a mixed beam; and a photodetector responsive to said mixed beam for producing an electric information signal representative of said information;

said voltage adjusting means using said information signal as said electric control signal in adjusting said output polarization state to said linear polarization state.

10. An automatic polarization controlling device as claimed in claim 9, wherein said optical mixer is of a waveguide type.

11. An automatic polarization controlling device as claimed in claim 9, wherein said optical mixer is of a fiber type.

12. An automatic polarization controlling device as claimed in claim 6, wherein said reference polarization state is an optionally varying polarization state of a signal beam representative of information.

13. An automatic polarization controlling device as claimed in claim 12, said input polarized beam being a local oscillation beam having a linear polarization state, wherein:

said monitoring means comprises:

an optical mixer mixing said device output polarized beam and said signal beam into a mixed beam; and a photodetector responsive to said mixed beam for producing an electric information signal representative of said information;

said voltage adjusting means using said information signal as said electric control signal in adjusting said output polarization state to said optionally varying polarization state.

14. An automatic polarization controlling device as claimed in claim 13, wherein said optical mixer is of a waveguide type.

15. An automatic polarization controlling device as claimed in claim 13, wherein said optical mixer is of a fiber type.

* * * * *

UNITED STATES PATENT AND TRADEMARK OFFICE
CERTIFICATE OF CORRECTION

PATENT NO. : 4,752,120
DATED : June 21, 1988
INVENTOR(S) : Shimizu

It is certified that error appears in the above-identified patent and that said Letters Patent is hereby corrected as shown below:

| | |
|---|---|
| COLUMN 1, LINES 64 AND 65 | Delete "monotonically" and insert --monotonously--; |
| COLUMN 4, LINES 28 AND 29 | After "dividing" insert --or separation--; |
| COLUMN 4, LINE 31 | After "dividing" delete "or separation" |
| COLUMN 6, LINES 3 and 4, | Delete "m and n" and insert --$\underline{m}$ and $\underline{n}$--; |
| COLUMN 9, LINE 57 | Delete "theremally" and insert --thermally--; |
| COLUMN 11, LINE 18 | Delete "dilivered" and insert --delivered--; |
| COLUMN 12, line 54 | Delete "brach" and insert --branch--; |
| COLUMN 15, LINE 3 | Delete "respectively" |
| COLUMN 15, LINE 41 | After "means" delete the comma (,); |
| COLUMN 15, LINE 43 | After "means" delete the comma (,); |
| COLUMN 15, LINE 53 | Delete "modulos" and insert --modulus--; |
| COLUMN 16, LINE 5 | Delete "driving" insert --dividing--; |

UNITED STATES PATENT AND TRADEMARK OFFICE
CERTIFICATE OF CORRECTION

PATENT NO. : 4,752,120
DATED : June 21, 1988
INVENTOR(S) : Shimizu

Page 2 of 2

It is certified that error appears in the above-identified patent and that said Letters Patent is hereby corrected as shown below:

COLUMN 16, LINE 20 Delete "2 modulos" and insert
-- a modulus --.

Signed and Sealed this

Sixth Day of December, 1988

Attest:

DONALD J. QUIGG

Attesting Officer

Commissioner of Patents and Trademarks